June 19, 1962   J. T. HARPER ETAL   3,039,797
QUICK DISCONNECT WAVEGUIDE COUPLING
Filed Jan. 26, 1959

JOHN T. HARPER
JOHN M. ASKINS
*INVENTORS*

BY Thomas J. Holden
ATTORNEY

United States Patent Office 3,039,797
Patented June 19, 1962

3,039,797
QUICK DISCONNECT WAVEGUIDE COUPLING
John T. Harper, Baltimore, and John M. Askins, Timonium, Md., assignors to Aircraft Armaments, Inc., Cockeysville, Md., a corporation of Maryland
Filed Jan. 26, 1959, Ser. No. 789,120
4 Claims. (Cl. 285—395)

This invention relates to connectors, and more particularly, to a connector for quickly joining sections of flanged waveguide.

Waveguide is the name given to hollow tubes which form conduits for the transmission of power and signals at microwave frequencies. Being shorter than 30 centimeters in length, or exceeding 1,000 mc./sec. in frequency, microwaves are of the same order of magnitude as the dimensions of the apparatus in which they are used. In this respect, microwave phenomena is analogous to that of sound waves; and like sound waves, microwaves may be propagated along hollow tubes or waveguides. Waveguides thus form microwave transmission circuits which function to interconnect specialized R.-F. components such as transmitters, antennas and the like in radar, communication and navigation equipment.

To facilitate construction of microwave transmission circuits, waveguides are made in sections with square or rectangular flanges provided at the ends for coupling the sections together. There are two classes of couplings: (1) contact coupling and (2) choke-flange coupling. In contact coupling, flat flanges soldered to the ends of tubing are bolted together to mate adjacent sections of waveguide. The contacting faces of these flanges must be planar and parallel to insure good contact across the entire surface if losses and reflections at the mating junction are to be minimized. A choke-flange coupling is essentially a series-branching transmission line whose length is one-half the wavelength of that of the microwaves whose transmission is desired so as to present zero series impedance to the main line. It is common to form the outer quarter wavelength portion in a flange by forming a circular groove in the contacting surface, with the depth of the groove chosen as the remaining quarter wavelength. The choke flange so formed is mated with a plane flange on an adjacent section of waveguide, and bolted together. Because of the necessity for providing grooves in a choke flange, its thickness is somewhat in excess of that of a plane flange. Consequently, the thickness of a choke-coupling is greater than that of a contact-coupling.

Waveguide will transmit power at microwave frequencies most effectively when it is rigid. However, in certain applications, flexible sections of waveguides are required. Such sections are mandatory when allowance must be made for the relative movement between two R.-F. components, as for example, where the components are separately shock mounted or where the relative movement is an essential part of the function of the equipment. Flexible waveguide is also found useful in temporary installations and in experimental or test apparatus. In these cases, frequent coupling and uncoupling between a flexible section of waveguide and a rigid section is usually necessary so that a bolted connection becomes inconvenient.

A flexible waveguide section lacks sufficient rigidity to support itself with its flange in contacting registration with the flange of a rigid waveguide section while the connector is being actuated to achieve mating. This does not pose a problem when the connector can be actuated with one hand because the other hand is then free to supply the required support. However, most connectors capable of actuation with one hand are not adaptable for use with both a choke-flange coupling and a contact coupling because they cannot adapt themselves to the differences in flange thicknesses. Because of the necessity for including both types of couplings and for drawing up the flanges of the coupling into tight engagement, it has been necessary to resort to connectors using a threaded portion which serves to apply an axially directed clamping force to the flanges that is proportional to the turning effort applied to the connector. However, such threaded connectors require an operator to use both hands just to actuate the connector.

Much effort has been expended to contribute a connector of the class described in which the operation thereof does not hinder the connection of the mating flanges in the manner set forth, but so far as is known, no successful connector of the class described has yet been contributed to the art, and the problems here outlined remain unsolved. It is an object of this invention to contribute a connector of the class described, in which the provision of a threaded connection for drawing the flanges into tight engagement does not require an operator to use both hands to actuate the device.

As a feature of this invention by which the objects thereof are realized, one element of a two-part coupling is non-rotatably mounted on one flange, preferably the one on the rigid waveguide, with the other element axially movable on the one element in response to its rotation. When the flanges to be mated are in contacting registration, the same means which serves to provide the clamping pressure serves to limit rotation of the other element to a position preventing separation of the flanges. Since one of the elements is stationary, rotation of the other can be easily achieved with one hand to apply a clamping force to the mating flanges which is proportional to the turning effort applied to the movable element.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 1:
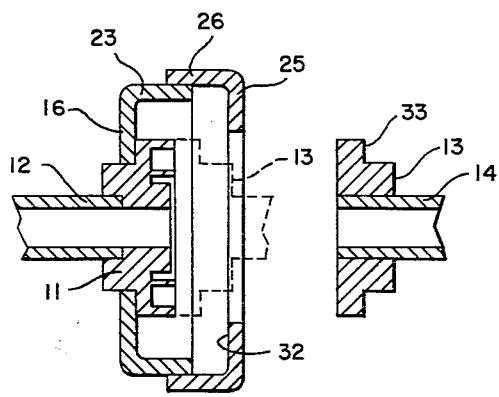
FIGURE 1 is a sectional view taken along the lines 1—1 of FIGURE 2 and showing the coupling attached to one flange and in position to receive the mating flange of an adjacent waveguide section.
Figure 3:
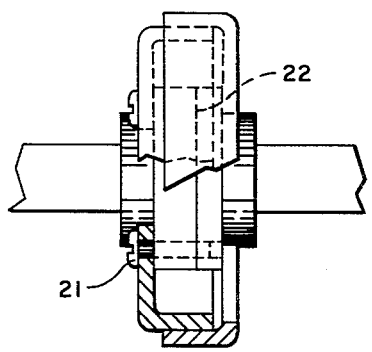
FIGURE 3 is a view similar to that shown in FIGURE 1 but showing the coupling clamping the mating flange in place.

Referring now to the drawing, a coupling made in accordance with the invention is shown in FIGURE 1 to be positioned for connecting choke flange 11 of waveguide section 12 to plain flange 13 of adjacent waveguide section 14. The coupling has a supporting cup 15 with a base 16 lying in a plane normal to the axis of the waveguide. A cruciform opening 17 is provided in base 16 such that four tabs 18 are formed. A hole 19 in each tab is coaxial with threaded holes 20 provided in the corners of choke flange 11. Threaded screws 21 are used to attach base 16 to flange 11. The length of these screws as shown in FIGURE 3 is such as to extend past the face 22 of flange 11, which face is likewise in a plane normal to the axis of the waveguide. As seen in FIGURE 1, supporting cap 15 has cylindrical walls 23 attached to base 16 which may extend beyond face 22.

Movable cap 24 has base 25 normal to the axis of the waveguide with cylindrical walls 26 nested over walls 23 of cap 15. Centrally located in base 25 is aperture 27 which is of the same configuration as flange 13 and sufficiently large to effect its passage as indicated by the broken lines in FIGURE 1. Located on the inner periphery 28 of cap 24 are tabs 29 which are formed by a punching operation that partially severs a rectangular segment 30. Three such tabs are illustrated in the drawing but it is obvious that any number could be used.

Figure 4:
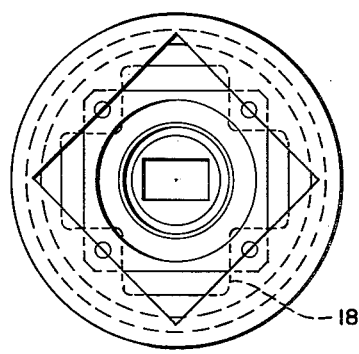
FIGURE 4 is a front view of the coupling showing how the mating flange is clamped in place.

Located in cylindrical walls 23 of cap 15 are slots 31 which are inclined with respect to the axis of the waveguide to form multiple screw threads with which tabs 29 are engageable. When tabs 29 are engaged in the portion of slots 31 closest to the open end of cap 15, inner face 32 of cap 24 which defines aperture 27 is spaced from face 22 on flange 11 as shown in FIGURE 1. When tabs 29 are engaged in the portion of slots 31 closest to base 16, inner face 32 overlies the corners of flange 13 as shown in FIGURE 4. Tabs 29 move in slots 31 when cap 24 is rotated upon stationary cap 15, and the lead is such that approximately a quarter turn of cap 24 will move the cap from the position shown in FIGURE 2 to that shown in FIGURE 4.

Flange 13 is provided with unthreaded holes which, when the flange is in contacting registration with flange 11, are engageable upon the ends of screws 21 which extend beyond face 22 as shown in FIGURE 3.

Figure 2:
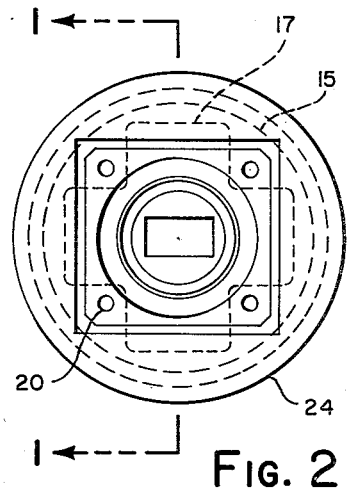
FIGURE 2 is a front view of the coupling showing how the mating flange can be positioned in contacting registration.

In operation, cap 24 is rotated to the position shown in FIGURE 2 with aperture 27 able to effect entry of flange 13 through base 25. Aided by the ends of screws 21, flange 13 is guided into contacting registration with choke flange 11 so as to form a continuous passageway for the guiding of energy from waveguide section 12 to waveguide section 14. While holding guide 14 with one hand, the operator simply grasps cap 24 with the other hand and rotates the same from the position shown in FIGURE 2 to that shown in FIGURE 4. During such rotation, surface 32 is caused to move axially into engagement with rear face 33 of flange 13. The clearance between surface 32 and face 33 when cap 24 is in the position shown in FIGURE 2 is approximately one-quarter of the lead of threads 31. When cap 15 is connected to a plain flange instead of a choke flange, such clearance is increased and cap 24 may be rotated slightly farther than one-quarter of a turn before surface 32 engages face 33.

Figure 5:
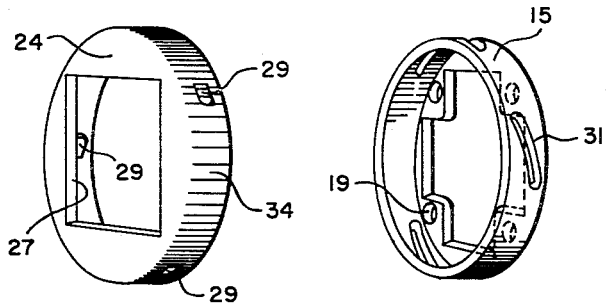
FIGURE 5 is an exploded view of the coupling.
Figure 6:
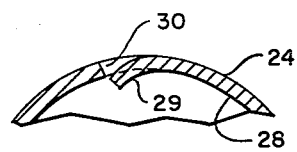
FIGURE 6 is an enlarged showing of a construction of the tab used to interconnect the parts of the coupling.

As surface 32 moves toward support 16, it will begin to overlie the corners of flange 13 and eventually will contact face 33 as cap 24 is rotated further. The outer surface of cap 24 is knurled as indicated at 34 (FIGURE 5) so that a secure grip can be had to apply a clamping force to flanges 11, 13 that is proportional to the turning effort applied to the cap. Furthermore, the engagement of surface 32 with face 33 limits rotation of cap 24 to the position where it will overlie and clamp the flanges together. The pitch of the threads is such that they are self-locking. That is, frictional force parallel to slots 31 acting on tabs 29, and arising from axial pressure exerted by tabs 29 on slots 31 has too small a component acting normal to the axial pressure to cause cap 24 to back off after it is securely engaged with the flange. By forming cap 25 from sheet material, the natural resiliency of base 24 can also be utilized to securely maintain the flanges in mating position.

Before assembling cap 24 onto cap 15, tabs 29 formed by a lancing operation, are pushed back flush with cylindrical walls 26. After assembling the caps, the tabs are introduced into slots 31. By this means, rotation of cap 24 tending to move surface 32 away from base 16 and aperture 27 out of alignment with the flanges, is limited by the ends of slots 31 acting on tabs 29; and rotation of cap 24 tending to move surface 32 toward base 16 and into engagement with face 33 is limited by the engagement of such surface therewith. Thus cap 15 is attached to a section of waveguide, and cap 24 is attached to cap 15, so that the entire coupling is always together ready for instant use.

Those skilled in the art will appreciate that by this invention there is provided a coupling which is usable with any thickness of mating flanges and which will securely clamp the flanges together. It will be further appreciated that the coupling parts form a unitary device whose parts cannot be lost or misplaced and which can be operated with but one hand so that the other hand can be used to hold the waveguide before and after it is disconnected.

What is claimed is:

1. In combination with one flange at the end of one section of waveguide and a square flange at the end of another section of waveguide, a coupling for clamping the square flange to the one flange when the axes of the sections are aligned and the flanges are in contacting registration comprising:

a. a support having a base and cylindrical walls;
    b. means rigidly securing said base to said one flange with the walls of said support being parallel to the axis of said one section;
    c. a cap having a planar surface and cylindrical walls;
    d. said surface having a square opening therein slightly larger than the size of said square flange;
    e. said cap being mounted on said support with the cylindrical walls thereof in nested relationship and said planar surface being normal to the axis of said one section;
    f. cooperating helical means on said cylindrical walls for effecting axial movement of said surface toward said one flange in response to angular movement of said cap in a certain direction relative to said support;
    g. said cap having a given angular position at which said surface is axially spaced from said one flange when the opening is oriented to effect passage therethrough of said square flange into contacting registration with said one flange;
    h. angular movement of said cap from its given angular position and in said certain direction through an angle less than ninety degrees when said flanges are in contacting registration causing the opening in said cap to become misaligned with respect to said square flange and said surface to move axially into overlying engagement with said square flange for clamping the latter to said one flange; and
    i. means to prevent said cap from being detached from said support.

2. The combination of claim 1 wherein:

a. one cylindrical wall has at least two helical slots therein;
    b. the other cylindrical wall has at least two tabs thereon respectively extending radially into said slots; and
    c. said slots and tabs constituting said cooperable helical means.

3. The combination of claim 1 wherein:

a. one cylindrical wall has at least two helical slots therein;
    b. the other one cylindrical wall has at least two tabs thereon respectively extending radially into said slots;
    c. said tabs abut one end of said slots; and
    d. said slots and tabs constituting said cooperative helical means, and the abutment of said tabs with one end of said slot constituting said means to prevent said cap from being detached from said support.

4. The combination of claim 3 wherein said one end of said slots is so located in the cylindrical wall of said cap that when said tabs abut said one end of said slots, said cap is in said given angular position.

References Cited in the file of this patent

UNITED STATES PATENTS

| 407,046 | Wilcox | July 16, 1889 |
| 1,904,627 | Olevin | Apr. 18, 1933 |
| 2,317,729 | Bruno | Apr. 27, 1943 |
| 2,774,616 | Dodd et al. | Dec. 18, 1956 |